Figure 1:
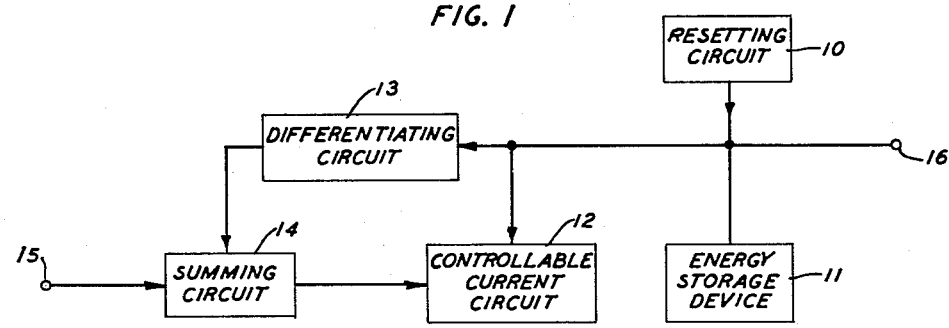

Aug. 4, 1964   J. W. PADALINO   3,143,659
CIRCUITS FOR PRODUCING RAMP WAVEFORMS
Filed Nov. 6, 1959

INVENTOR
J. W. PADALINO
BY
ATTORNEY

United States Patent Office 3,143,659
Patented Aug. 4, 1964

3,143,659
CIRCUITS FOR PRODUCING RAMP
WAVEFORMS
John W. Padalino, Cedar Knolls, N.J., assignor to Bell
Telephone Laboratories, Incorporated, New York,
N.Y., a corporation of New York
Filed Nov. 6, 1959, Ser. No. 851,476
5 Claims. (Cl. 307—88.5)

This invention relates to electrical wave forming circuits and in particular to circuits that produce voltages having ramp waveforms.

Ramp generators are used to perform a number of functions including the integration of direct potentials with respect to time. A large group of prior art ramp generators takes advantage of the well known fact that the voltage across a capacitor is equal to its charge divided by its capacitance. In particular, substantially constant currents are used to either charge or discharge capacitors to cause the voltages across the capacitors to change at substantially constant rates. Furthermore, in order to improve the linearity of the ramp voltages thus generated, various arrangements have been proposed for improving the constancy of these charging or discharging currents.

The linearities of the ramp voltages generated in the above manner not only depend upon the constancy of the charging or discharging currents but also upon the constancy of the actual or apparent capacitances of the capacitors. These actual or apparent capacitances may vary, however, as a result of inherent characteristics of the capacitors. When producing relatively short duration ramp voltages, for example, it has been found that the inductance characteristics of a capacitor may cause its apparent capacitance to vary which in turn produces a nonlinear output. Furthermore, it is not always possible or economically practical to reduce these inherent characteristics so as not to interfere to an undesirable extent with the linearity of the ramp voltage.

An object of the present invention is to produce, by changing the energy in an energy storage device, a ramp voltage which is relatively independent of the storage characteristics of the device.

The present invention, in one of its broader aspects, also produces a ramp voltage by controlling the current that changes the energy in an energy storage device such as a capacitor. The present invention, however, is not founded on the principle of maintaining this current substantially constant but instead controls the current so that it is dependent on the rate of change or slope of the ramp voltage. In particular, the difference between an input or reference signal and a feedback signal proportionate to the slope of the ramp voltage is used to control the current. By using a feedback signal proportionate to the slope of the ramp voltage, actual or apparent changes in the storage characteristics of the storage device have substantially less effect on the slope of the ramp voltage as any change in the slope causes a change in the current in a direction tending to maintain a constant slope. The extent to which the slope is maintained constant is, as appreciated by those experienced in the feedback art, a function of the sensitivity of this current controlling action to changes in the slope. In accordance with the invention the sensitivity of the current controlling action is increased when necessary through the use of amplifying devices until the desired linearity of the slope is obtained.

In several embodiments of the invention, a current controlling device, such as a vacuum tube or a transistor, is used either to charge or discharge a capacitor while a resistor-capacitor differentiator connected across the capacitor produces a signal proportional to the slope of the capacitor voltage. This signal and an input or reference signal are applied to the input circuit of the current controlling device so that the device is regulated by the combination of these two signals. In operation, the input or reference signal is adjusted to produce the desired slope of the capacitor voltage while the differentiator feedback signal tends to maintain the slope constant.

A feature of the invention is that the differentiating circuit feedback path also permits wider storage characteristic tolerances than heretofore possible to be placed on the energy storage devices. In other words, the feedback path not only reduces the effects of either actual or apparent changes in storage characteristics of the storage devices during the operation of the invention but also reduces the effects of variations in the nominal storage characteristics of the devices being used.

These and other objects and features of the invention will become apparent from a study of the following detailed descriptions of two specific embodiments of the invention.

Figure 2:
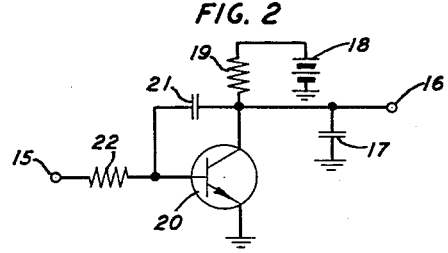
Figure 3:
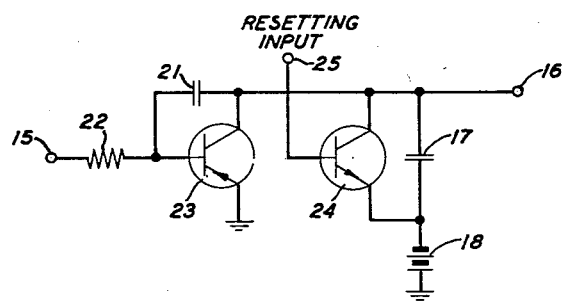

In the drawings:
FIG. 1 is a block diagram illustrating the invention; and
FIGS. 2 and 3 are schematic diagrams of several embodiments of the invention.

The block diagram of FIG. 1 illustrates the various functions performed in carrying out the present invention. In the diagram, a resetting circuit 10 is connected to an energy storage device 11 for placing a predetermined amount of energy in the device. Connected to device 11 is a controllable current circuit 12 for controllably changing the energy stored in the device. Also connected to device 11 is a differentiating circuit 13 for producing a signal proportionate to the rate of change or slope of the voltage across device 11. The output of differentiating circuit 13 is applied to an input terminal of a summing circuit 14 while a second input terminal of summing circuit 14 is connected to a terminal 15 which receives input signals. The output of summing circuit 14 is applied to a regulating input terminal of controllable current circuit 12. An output terminal 16 is connected to device 11 for making available the device voltage.

In embodiments of the present invention, the output of differentiating circuit 13 and the input signals applied to terminal 15 may be applied directly to controllable current circuit 12 with the summing action performed by summing circuit 14 actually taking place within controllable circuit 12. It should be understood, therefore, that the block diagram of FIG. 1 is meant primarily for explaining the various functions performed in carrying out the invention and that some of the elements used in embodiments of the invention, as will become apparent in discussing the embodiments of FIGS. 2 and 3, may be used in performing more than one function.

During the time that resetting circuit 10 is placing a predetermined amount of energy in device 11, controllable current circuit 12 may or may not be passing a current depending upon the signal applied to terminal 15. When a signal is applied to terminal 15 so that current circuit 12 is passing a current during the placing of the predetermined amount of energy in device 11, resetting circuit 10 should have a relatively low impedance during the resetting cycle and a relatively high impedance during the time the energy in the device is being controllably changed. Under these conditions resetting circuit 10 may include a serially connected switching device, such as a thyratron or a transistor, that is closed during the resetting cycle and opened during the time the energy is being controllably changed. When, however, the signal applied to terminal 15 does not cause current circuit 12 to conduct during the resetting cycle, resetting circuit 10 may have a relatively high impedance at all times as long as the resetting current is sufficient to place the predetermined amount of energy in device 11 during the resetting cycle and is a relatively small fraction of the current passing through current circuit 12 during the time that the energy is being controllably changed. The charging characteristics of resetting circuit 10 therefore depend upon the nature of the signal applied to terminal 15.

The controllable changing of the energy in device 11 is dependent on both the signal applied to terminal 15 and the feedback signal produced at the output of differentiating circuit 13. The signal applied to terminal 15 is at a contsant level during the controllable energy changing cycle when a substantially constant slope voltage is desired at terminal 16, although when used as an integrator the input signal may have a varying amplitude with the instantaneous slope of the output voltage being linearly related to the instantaneous level of the input signal. As stated previously the signal fed back by differentiating circuit 13 is proportionate to the slope of the output voltage. When the slope is constant the feedback signal is likewise constant. This constant signal is subtracted in summing circuit 14 from a constant input signal to apply a constant input to current circuit 12 which in turn passes a constant current to cause the voltage across device 11 to change at a constant rate. When, however, the slope of the output voltage increases or decreases because, for example, of a change in the storage characteristics of device 11, the feedback signal increases or decreases, respectively, and the regulation of current circuit 12 is changed to cause a current to flow that causes the voltage to revert substantially to its original slope. The voltage does not revert precisely to its original slope as some error signal must be fed back (as appreciated by those experienced in the feedback art) to produce the correcting or forcing action. As mentioned previously, the extent to which the voltage approaches its orignal slope depends upon the sensitivity of this feedback action so that an increase in the gain of the feedback path causes the voltage to return more closely to its initial slope.

In accordance with a feature of the invention the feedback path also corrects for changes in slope produced by changes in the operating characteristics of both controllable current circuit 12 and resetting circuit 10 in a manner identical to that described with respect to changes in the storage characteristics of device 11.

An embodiment of the invention which produces a negative-going ramp voltage is shown in FIG. 2. In this embodiment, a capacitor 17 corresponds to energy storage device 11 of FIG. 1 while a potential source 18 and a resistor 19 correspond to resetting circuit 10 of FIG. 1. Source 18 and resistor 19 are serially connected across capacitor 17 with both the negative terminal of source 18 and one of the terminals of capacitor 17 being connected to a point of ground potential. An NPN transistor 20 which has its collector electrode connected to the ungrounded terminal of capacitor 17 and its emitter electrode connected to ground corresponds to controllable current circuit 12 of FIG. 1. A capacitor 21 is connected between the collector and base electrodes of transistor 20 and in cooperation with the base-to-emitter path of transistor 20 performs the differentiating function of differentiating circuit 13 of FIG. 1. Connected between input terminal 15 and the base electrode of transistor 20 is a resistor 22 which in cooperation with the base-to-emitter path of transistor 20 performs the summing action of summing circuit 14 of FIG. 1.

As previously discussed, the resetting characteristics of resetting circuit 10 of FIG. 1 are dependent on the input signal applied to terminal 15. In the embodiment of FIG. 2, the input signal is intended to cause transistor 20 to conduct only during the times that a ramp voltage is desired. The resetting circuit in this embodiment may therefore comprise source 18 and resistor 19 as long as the current passed by resistor 19 is a small fraction of the current passed by transistor 20 when conducting and sufficient time elapses between input signals to permit capacitor 17 to be charged. Resistor 19, however, may be replaced by a switch that is closed except when an input signal is applied to terminal 15. In operation, capacitor 17 is charged by source 18 and resistor 19 and controllably discharged by transistor 20.

An embodiment of the invention which produces a positive-going ramp voltage is shown in FIG. 3. In this embodiment, a capacitor 17 again corresponds to energy storage device 11 of FIG. 1 while a PNP transistor 23 and a potential source 18 correspond to controllable current circuit 12 of FIG. 1. Capacitor 17 is connected between the negative terminal of source 18 and the collector electrode of transistor 23 while the emitter electrode of transistor 23 and the positive terminal of source 18 are both connected to a point of ground potential. An NPN transistor 24 having its base electrode connected to a resetting input terminal 25, its collector electrode connected to the terminal of capacitor 17 which is connected to transistor 23 and its emitter electrode connected to the remaining terminal of capacitor 17 corresponds to resetting circuit 10 of FIG. 1. A capacitor 21 is connected between the collector and base electrodes of transistor 23 and a resistor 22 is connected between an input terminal 15 and the base electrode of transistor 23. Resistor 22 and capacitor 21 perform functions identical to those performed by the same components in the embodiment of FIG. 2.

In operation, capacitor 17 of FIG. 3 is discharged by the switching action of transistor 24 in response to signals applied to resetting input terminal 25, and is controllably charged (when transistor 24 appears as open circuit) by transistor 23 and source 18 in response to a signal applied to input terminal 15. Because transistor 24 provides either a relatively high or low impedance, the signals applied to input terminal 15 may be continuously applied; that is, they may be applied, as discussed previously during the resetting cycle as well as during the ramp voltage producing cycle. When applied in a continuous manner, the beginning of the ramp voltage outputs are controlled by the removal of the resetting signal applied to terminal 25 so that capacitor 17 may begin to accumulate a charge.

While the invention has been described with respect to several specific embodiments, it will be evident to those skilled in the art that various modifications may be made without departing from the spirit and scope of the invention.

What is claimed is:

1. A combination comprising a capacitor for storing a predetermined amount of energy, controllable means for changing the energy in said capacitor to change the voltage across said capacitor, means for producing a signal proportionate to the rate of change of voltage across said capacitor, means for applying both said signal and an input signal to said controllable means, and means for placing said predetermined amount of energy in said capacitor whenever said controllable means is substantially not changing the energy in said capacitor.

2. A combination in accordance with claim 1 in which said means for producing a signal proportionate to the rate of change of voltage across said capacitor comprises a differentiating circuit.

3. A combination comprising a first capacitor, a transistor having base, emitter and collector electrodes, means connecting said collector electrode to one terminal of said first capacitor and said emitter electrode to the other terminal of said first capacitor, a second capacitor, means connecting said second capacitor between said collector and base electrodes, an input terminal, a resistor, means connecting said resistor between said input terminal and said base electrode, and means for placing a predetermined amount of energy in said first capacitor whenever said transistor is in a substantially nonconducting state.

4. A combination in accordance with claim 3 in which said means for placing a predetermined amount of energy in said first capacitor comprises a source of direct potential and means for connecting said source across said first capacitor.

5. A combination in accordance with claim 3 in which said means for placing a predetermined amount of energy in said first capacitor comprises a direct current path and means for connecting said path across said first capacitor, and said means for connecting said collector and emitter electrodes to said first capacitor terminals includes a source of direct potential.

References Cited in the file of this patent

UNITED STATES PATENTS

| | | |
|---|---|---|
| 2,439,324 | Walker | Apr. 6, 1948 |
| 2,548,532 | Hedeman | Apr. 10, 1951 |
| 2,663,800 | Herzog | Dec. 22, 1953 |
| 2,715,182 | Bishop | Aug. 9, 1955 |
| 2,835,809 | Taylor | May 20, 1958 |
| 2,915,650 | Williams | Dec. 1, 1959 |
| 2,962,663 | Hileman | Nov. 29, 1960 |
| 3,011,068 | McVey | Nov. 28, 1961 |
| 3,025,469 | Jackson | Mar. 13, 1962 |